(12) United States Patent
Grigsby et al.

(10) Patent No.: US 9,787,487 B2
(45) Date of Patent: *Oct. 10, 2017

(54) FACILITATING MEDIA STREAMING WITH SOCIAL INTERACTION

(71) Applicant: Amazon Technologies, Inc., Seattle, WA (US)

(72) Inventors: Travis M. Grigsby, Seattle, WA (US); Kenneth King-Fung Lee, Seattle, WA (US); Michael S. Mayo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/662,914

(22) Filed: Mar. 19, 2015

(65) Prior Publication Data

US 2015/0195097 A1   Jul. 9, 2015

Related U.S. Application Data

(63) Continuation of application No. 13/633,238, filed on Oct. 2, 2012, now Pat. No. 8,990,328.

(51) Int. Cl.
*H04L 12/18* (2006.01)
*H04L 12/58* (2006.01)
*G06F 3/0484* (2013.01)

(52) U.S. Cl.
CPC ........ *H04L 12/1822* (2013.01); *G06F 3/0484* (2013.01); *H04L 12/1818* (2013.01); *H04L 12/1845* (2013.01); *H04L 51/32* (2013.01)

(58) Field of Classification Search
CPC ...... H04L 51/16; H04L 65/4076; H04L 51/32
USPC ....... 709/203, 206, 217, 219, 223, 224, 230, 709/231, 232
See application file for complete search history.

(56) References Cited

U.S. PATENT DOCUMENTS

| | | | |
|---|---|---|---|
| 6,185,602 B1 * | 2/2001 | Bayrakeri | G06F 9/54 375/E7.003 |
| 8,639,085 B2 * | 1/2014 | Pejaver | H04L 65/4084 386/206 |
| 8,782,267 B2 * | 7/2014 | Gilson | H04N 5/765 386/241 |
| 2005/0028219 A1 * | 2/2005 | Atzmon | H04N 21/654 725/116 |
| 2007/0271337 A1 * | 11/2007 | Olson | G06Q 10/10 709/204 |
| 2008/0281448 A1 * | 11/2008 | Uhrig | G06Q 20/10 700/94 |
| 2010/0228547 A1 * | 9/2010 | Scott | G06Q 30/02 704/235 |
| 2011/0058101 A1 * | 3/2011 | Earley | H04L 12/1822 348/461 |

(Continued)

*Primary Examiner* — Lashonda Jacobs

(74) *Attorney, Agent, or Firm* — Thomas | Horstemeyer, LLP

(57) ABSTRACT

Disclosed are various embodiments for facilitating social interaction during a media item transmission. A group of participants may be formed based on a variety of factors. A media item is rendered on a first portion of a media player user interface. On a second portion of the media player user interface group members may communicate with each other concurrent with the streaming media item. The entire experience may be stored and replayed at another time.

20 Claims, 14 Drawing Sheets

(56) References Cited

U.S. PATENT DOCUMENTS

| | | | |
|---|---|---|---|
| 2012/0102517 A1* | 4/2012 | Yang | H04N 21/2365 725/17 |
| 2012/0150971 A1* | 6/2012 | Bahrainwala | G06Q 50/01 709/206 |
| 2013/0103814 A1* | 4/2013 | Carrasco | H04L 65/4092 709/223 |
| 2013/0133000 A1* | 5/2013 | Kelley | H04N 21/482 725/37 |
| 2013/0159126 A1* | 6/2013 | Elkady | H04L 67/10 705/26.1 |
| 2013/0262564 A1* | 10/2013 | Wall | H04N 21/2743 709/203 |

* cited by examiner

FACILITATING MEDIA STREAMING WITH SOCIAL INTERACTION

CROSS-REFERENCE TO RELATED APPLICATION

This application is a continuation of copending U.S. utility application entitled, "Facilitating Media Streaming with Social Interaction," having Ser. No. 13/633,238, filed Oct. 2, 2012, issuing as U.S. Pat. No. 8,990,328 on Mar. 24, 2015, which is entirely incorporated herein by reference.

BACKGROUND

Streaming media online to watch movies and television shows has become very popular in recent years. While users can easily access movies or television shows online, it is typically a solitary experience for the user. Further, due partially to society's growth, social contacts are more spread out across the globe, limiting the ability to share and enjoy the movie watching experience with a group of friends in the same location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
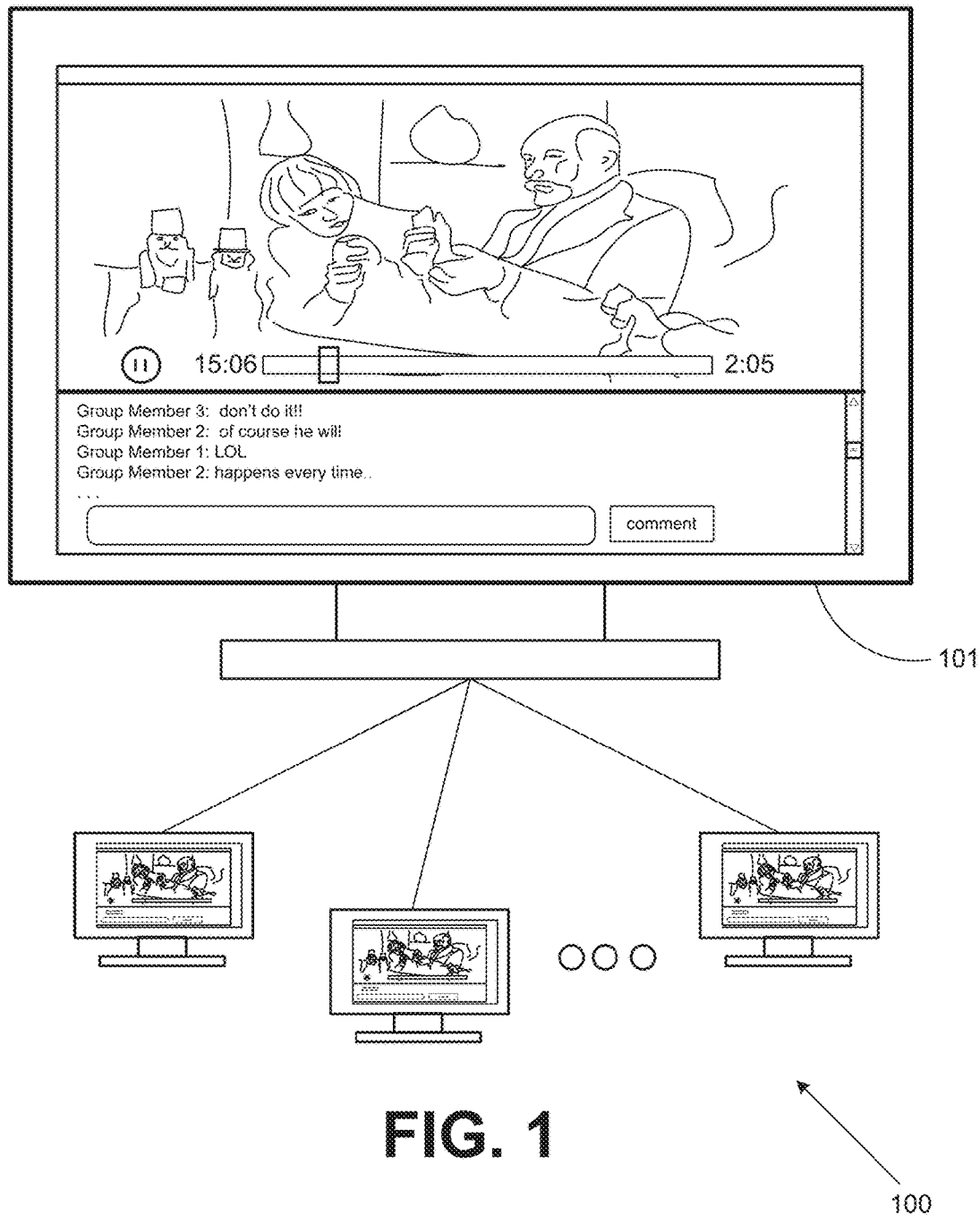
FIG. 1 is a drawing of an example of a media interaction environment according to various embodiments of the present disclosure.

The present disclosure relates to enhancing a media streaming experience by facilitating an interaction between multiple users all viewing the same media item. With reference to FIG. 1, shown is a collaborative viewing event 100 where media content, such as a movie, is consumed by a group of users through a user interface on respective displays 101. While consuming the media content on a portion of a user interface, the group of users may interact with each other on a separate portion of the user interface.

In various embodiments, groups of users may be formed to consume a media item where the interaction between users is limited to those that are members of the same group. The number of group members may be limited based on a predetermined maximum group size and/or a predetermined quorum. In one embodiment, a group may be formed based on a user's identification of specific group members. A notification of the media item streaming event is then sent to each of the group members. The media steam may begin on a user input, at a predetermined time, or when all the invited group members have accessed the media item.

In another embodiment, a user may select to be part of a group that may be formed based on a variety of factors that may include, for example, profile data 238. The profile data 238 may include, for example, demographics, geographic location, viewing history, purchase history, culture, favorite prior participants and other information.

In the following discussion, a general description of the system and its components is provided, followed by a discussion of the operation of the same.

Figure 2:
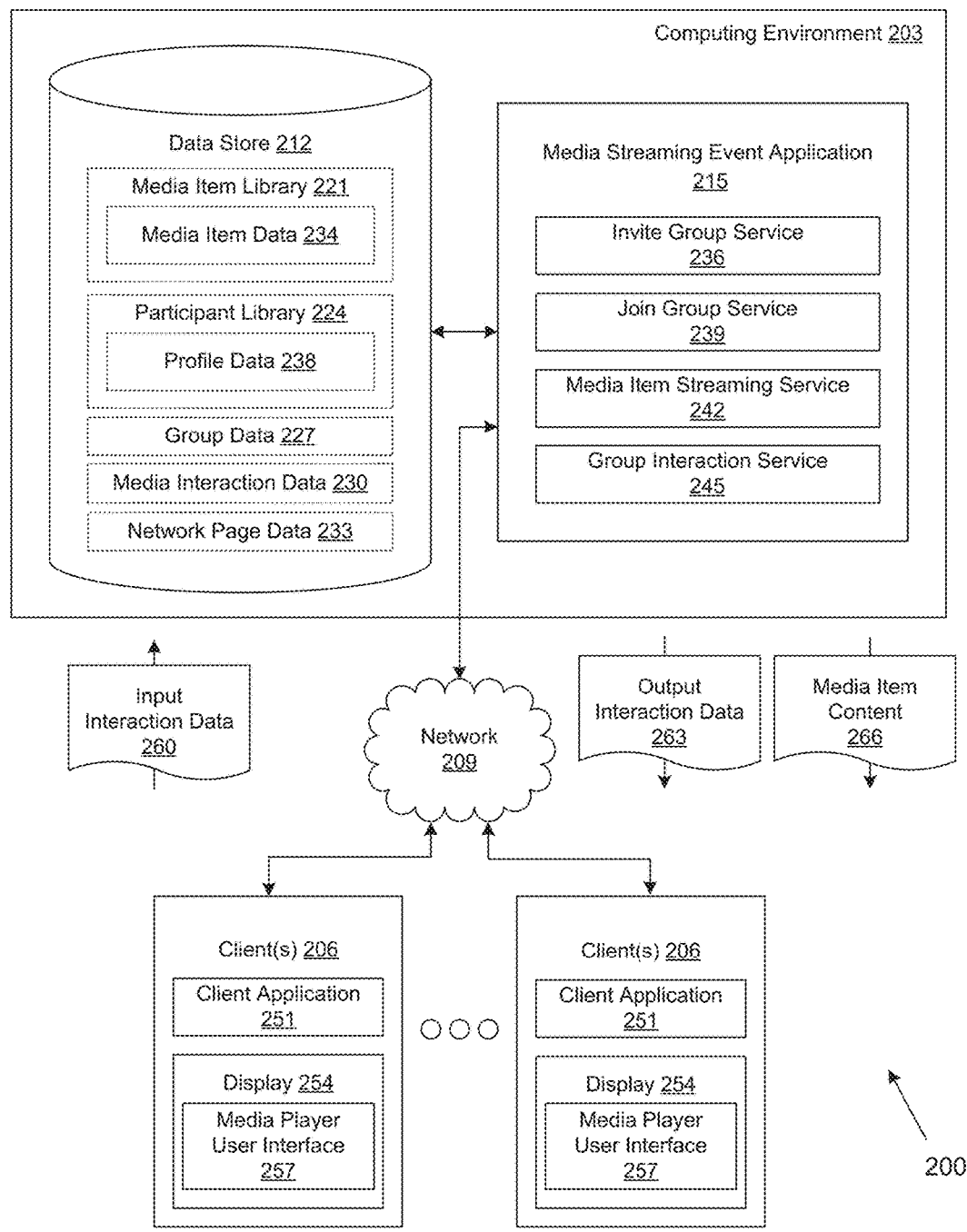
FIG. 2 is a drawing of a networked environment according to various embodiments of the present disclosure.

With reference to FIG. 2, shown is a networked environment 200 according to various embodiments. The networked environment 200 includes a computing environment 203, and a plurality of clients 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a media streaming event application 215 and other applications, services, processes, systems, engines, or functionality not discussed in detail herein. The media streaming event application 215 comprises an invite group service 236, a join group service 239, a media item streaming service 242, a group interaction service 245, and potentially other components.

The media streaming event application 215 is executed to facilitate the creation of a media item streaming event, streaming of a media item, interaction during a media item streaming event, and potentially other functions. The media streaming event application 215 may also serve up network pages, such as web pages that are encoded for rendering on clients 206. The invite group service 236 facilitates the creation of groups comprised of individual users who request to be part of a group. The join group service 239 facilitates the creation of a group based on user input that identifies specific group members. The join group service 239 may also facilitate the encoding and sending of a notification of the media item streaming event to the user-specified group members.

The media item streaming service 242 is executed to serve up or stream the media item content 266 to respective clients 206 to be rendered on the media player user interface 257. The group interaction service 218 facilitates an interaction between the clients 206 by receiving input interaction data 260 from a single client 206 and sending output interaction data 263 to other clients 206 in a group during rendering of a media content item 255 in the media player user interface 257 rendered on the clients 206.

The data stored in the data store 212 includes, for example, media item library 221, participant library 224, group data 227, media interaction data 230, network page data 233, and potentially other data. The media item library 221 comprises media item data 234. The media item data 234 comprises data that makes up to a media item including media item content 266 such as movies, television shows, video clips, music, and/or other forms of media items. The participant library 224 may contain profile data 238 which may include, for example, demographics, geographic location, viewing history, purchase history, culture, favorite prior participants, and other information. Group data 227 may include information pertaining to each group including, for example, group member identifiers, group quorum, and maximum group size. Media interaction data 230 may include the stored input interaction data 260 with an associated timestamp relative to the media item content 266 so that the stored input interaction data 260 may be accessed and rendered during a playback of a media content item 266.

Network page data 233 may include any data relating to network pages served up by the media streaming event application 215. To this end, network page data 233 may include static network pages or static elements of network pages, for example, in hypertext markup language (HTML), extensible markup language (XML), and/or any other language suitable for creating network pages. Further network page data 233 may include code that generates dynamic network pages when executed or interpreted in the computing environment 103. Such code may be written in any suitable programming language, such as PHP, Perl, Objective C, Java, Ruby, etc. Network page data 233 may also include code configured to be executed or interpreted within a client 206 in order to render a dynamic network page. Such code may be referred to as applets and may be written in any suitable programming language, such as Java Script, Java, etc.

Each client 206 is representative of a plurality of client devices that may be coupled to the network 209. Each client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each client 206 may include a display 254. Each display 254 may comprise, for example, one or more devices such as liquid crystal display (LCD) displays, gas plasma-based flat panel displays, organic light emitting diode (OLED) displays, LCD projectors, or other types of display devices.

Each client 206 may be configured to execute various applications such as a client application 251 and/or other applications. Each client application 251 may be executed in a client 206 for example, to access network content served up by the computing environment 203 and/or other servers, thereby rendering a user interface on the display 254. The client application 251 may, for example, comprise a browser, a mobile application, or other applications, and the user interface may comprise a network page, a mobile application screen, or other interface. Each client 206 may be configured to execute applications beyond the client application 251 such as, for example, word processors, spreadsheets, email applications, social networking applications, and/or other applications.

Next, a general description of the operation of the various components of the networked environment 200 is provided. To begin, a user may acquire rights to stream media item content 266 as part of media item data 234 in a media item library 221. The user at a client 206 may access a network page on a network site from a media streaming event application 215 over the network 209. Through this initial access, or through a subsequent access, the user at a client 206 may select a media item for streaming.

The media streaming event application 215 may then begin streaming the selected media item content 266 over the network to be rendered on the media player user interface 257 of the client 206. The media streaming event application 215 may stream the selected media content 266 over the network to a select group of clients 206. For users that are consuming the media item content 266 as a group, the users of the group may interact with each other, for example by text-based messages, on a separate portion of the display 254, either on a portion of the media player user interface 257 or some other interface.

In some embodiments, the user may request to be part of a group during the transmission of the media item content 266. The groups may be created by a user request that identifies members of a group. For example, the user may request to watch a movie with a select group of friends. The media streaming event application 215 may then notify the selected group of friends of the movie event, and then provide access to the movie event to only the selected group of friends. The groups may also be created by the media streaming event application 215 after such users send a request to join a group created by the media streaming event application 215.

The join group service 239 facilitates the creation of a group based on a pool of users who have requested to be placed in a group and have also selected the same media item for streaming. In one non-limiting example, the join group service 239 creates a group based on a predetermined quorum. Accordingly, a group may be created randomly using the pool of users so that the group size is equal to or exceeds the predetermined quorum. In another non-limiting example, a group may be formed based on a predetermined maximum group size. Accordingly, the join group service 239 may create a group by random selection where the number of users in the group does not exceed a predetermined maximum group size.

In another non-limiting example, the join group service 239 may create a group based on common characteristics of the users. Such characteristics may be determined based on the profile data 238 associated with each of the users in the pool of users. The profile data 238 may include, for example, at least one of the following factors: demographics, geographic location, viewing history, purchase history, culture, favorite prior participants and other characteristics. The predetermined quorum and/or predetermined group size may also be used as a factor in forming the group. For example, a group may not be formed until the pool of users contains at least the number of users equal to a predetermined quorum. Likewise, there may be a maximum number of users allowed in each group so that the experience is not convoluted with the interaction of too many users.

The invite group service 236 facilitates the formation of a user created group. In some embodiments, the invite group service 236 may receive inputs from a client 206 associated with a user identifying potential group members to invite. The invite group service 236 may also receive contact information associated with the group members. In some embodiments, the invite group service 236 may encode invitations with information associated with the media item streaming event. The information may include, the media item title, the event date, the event time, a link to access the streaming media item, an identifier, and/or any other information associated with media item streaming event.

The invite group service 236 may transmit the invitations to the selected group members at a respective client 206 by way of an electronic message, such as, for example, an email message, an instant message, a text message, a message embedded within a network page, mobile device notification, social media notification, or other type of message or notification that may be received within a computing device.

The media item streaming service 242 renders the media item content 266 on the display 254. The media item streaming service 242 synchronizes the rendering of the media item content 266 on the media player user interfaces 257 on the clients 206 associated with each of the group members. In some embodiments, the media streaming service 242 may receive a request to pause the transmission of the media item content 266 from a client associated with one of the group members. Upon request, the media streaming service 242 may pause the transmission of the media item content 266 to each media player user interface 257 rendered on each of the clients 206.

The media streaming service 242 may also receive a request to begin the transmission of the media item content 266 from a client 206 associated with one of the group members. Following the request, the media streaming service 242 may begin streaming the media item content 266. The request may be to initiate the streaming of the media item content 266 from the beginning. The request may also be to restart the streaming of the media item content 266 at the place in which the media streaming service 242 stopped the media item content 266 following a pause request.

A portion of the media item streaming event may facilitate interaction between the group members. The group interaction service 245 may receive input interaction data 260 from a client 206 associated with a group member. In some embodiments, the group interaction service 245 may create a timestamp relative to the run time of the media item content 266. The group interaction service 245 may store the timestamp and the input interaction data 260 in the media interaction data 230. The group interaction service 245 may transmit output interaction data 263 to the clients 206 associated with the other group members. The output interaction data 263 may be same as the input interaction data 260 received from a client 206 associated with one of the group members.

For example, a group may consist of group members named Joe, Alex, and Matt. While watching the movie, Joe notices a watch that he likes that the lead actor is wearing. Joe makes a comment through the user interface inquiring about the brand of watch. The comment is received by the group interacting service 245 as input interaction data 260. Upon receipt, the group interacting service 245 may create a timestamp based on the runtime of the media item content 266 and store Joe's comment and associated timestamp into the media interaction data 230. Further upon receipt, the group interaction service 245 converts Joe's comment to output interaction data 263 and subsequently sends the output interaction data 263 to be rendered on the interaction portion of media player user interface 257 or other user interface on each display 254 on the clients 206 associated with Joe, Alex and Matt. Therefore, Alex and Matt may view Joe's comment and respond accordingly.

In some embodiments, the output interaction data 263 may include commentary, advertisements and/or other data associated with the media item content 266 stored in the media item data 234. For example, using the movie item streaming event discussed above comprising group members Joe, Alex, and Matt, the group interaction service 245 may also send directory commentary relating to the movie as output interaction data 263 to the clients 206 associated with Joe, Alex, and Matt. In addition, the group interaction service 245 may also send advertisements relevant to the movie as output interaction data 263. Using the watch example discussed above, the group interaction service 245 may send an advertisement of the watch to be rendered on the interaction portion of each media player user interface 257 on each client 206 at the time the watch is displayed by the media item content 266.

In another embodiment, a user may request to replay a prior media item streaming event experience. Following a request by a user to replay a prior experience, the media streaming event application 215 may access the stored media interaction data 230 associated with the selected media item streaming event. The media item streaming service 242 may render the media item content 266 on a portion of the media player user interface 257 on the client 206 associated with the requesting user. Additionally, the group interaction service 245 may send the stored input interaction data 260 to be rendered on a portion of the media player user interface 257 at a time determined by the timestamp associated with the stored input interaction data 260 and media item content 266.

For example, Alex really enjoyed the movie watching experience with Joe and Matt due to the comical nature of the group's interaction. Alex may access the media streaming event application 215 at a later time, and request to replay the movie along with the included group commentary.

Figure 3A:
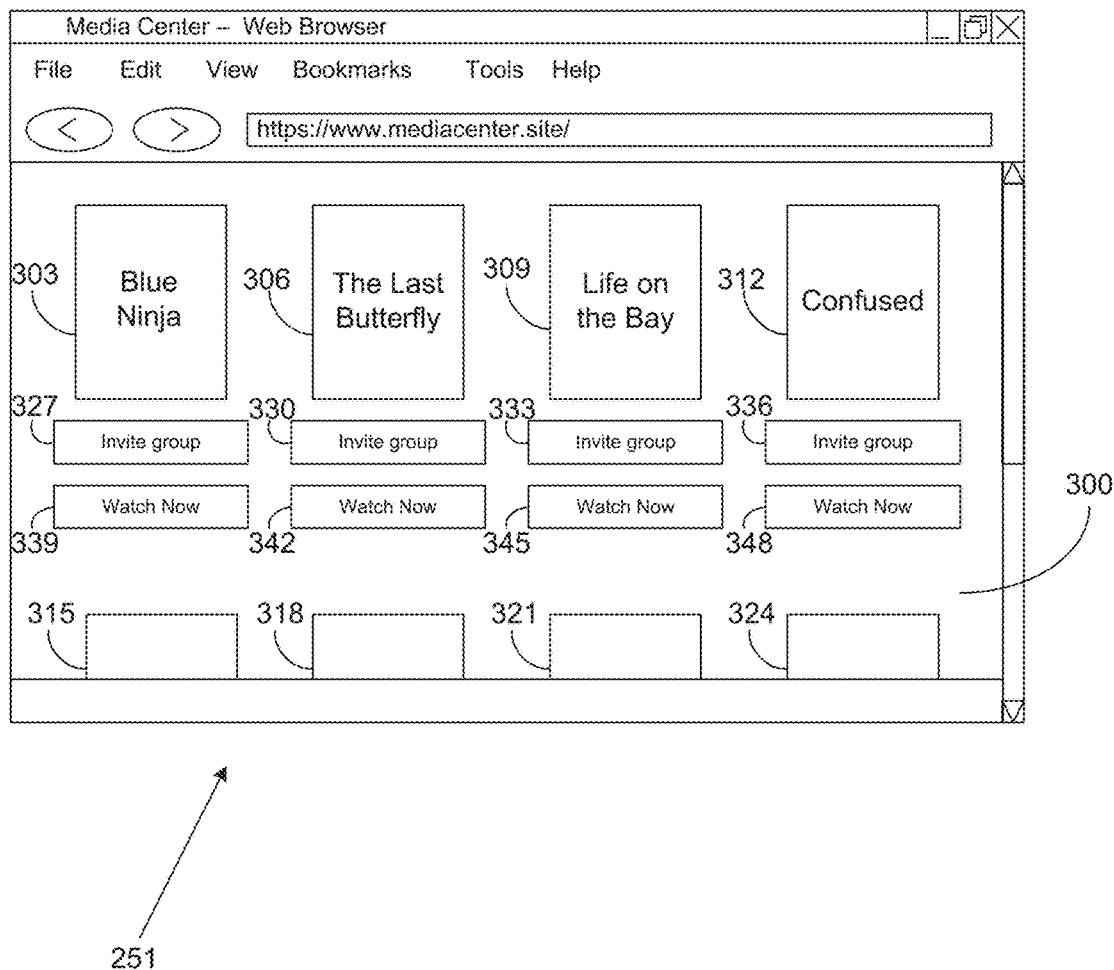
FIGS. 3A-6B are drawings of examples of user interfaces rendered by a client in the networked environment of FIG. 2 according to various embodiments of the present disclosure.

Turning now to FIG. 3A, shown is one example of a user interface rendered by a client 206 (FIG. 2) in the networked environment 200 (FIG. 2) according to various embodiments of the present disclosure. In particular, FIG. 3 depicts an example of a selection view 300 rendered by the client application 251. The selection view 300 depicts a portion of media items 303, 306, 309, 312, 315, 318, 321, 324 selected from the media item data 234 in the media item library 221.

Each of the media items 303, 306, 309, 312 includes a respective invite group button 327, 330, 333, 336 and a watch now button 339, 342, 345, 348. It is understood, however, that more or less information may be included for each media item 303, 306, 309, 312, 315, 318, 321, 324 in other embodiments. In various embodiments, the invite group button 327, 330, 333, 336 may comprise a link to access a network page used to obtain more information from the user regarding the group. The watch now button 339, 342, 345, 348 may comprise a link to access a network page used to access the steaming media item content 266. In some embodiments, the watch now button 339, 342, 345, 348 may comprise a link to access network page used to determine participation in a group during the media item streaming event.

Figure 3B:
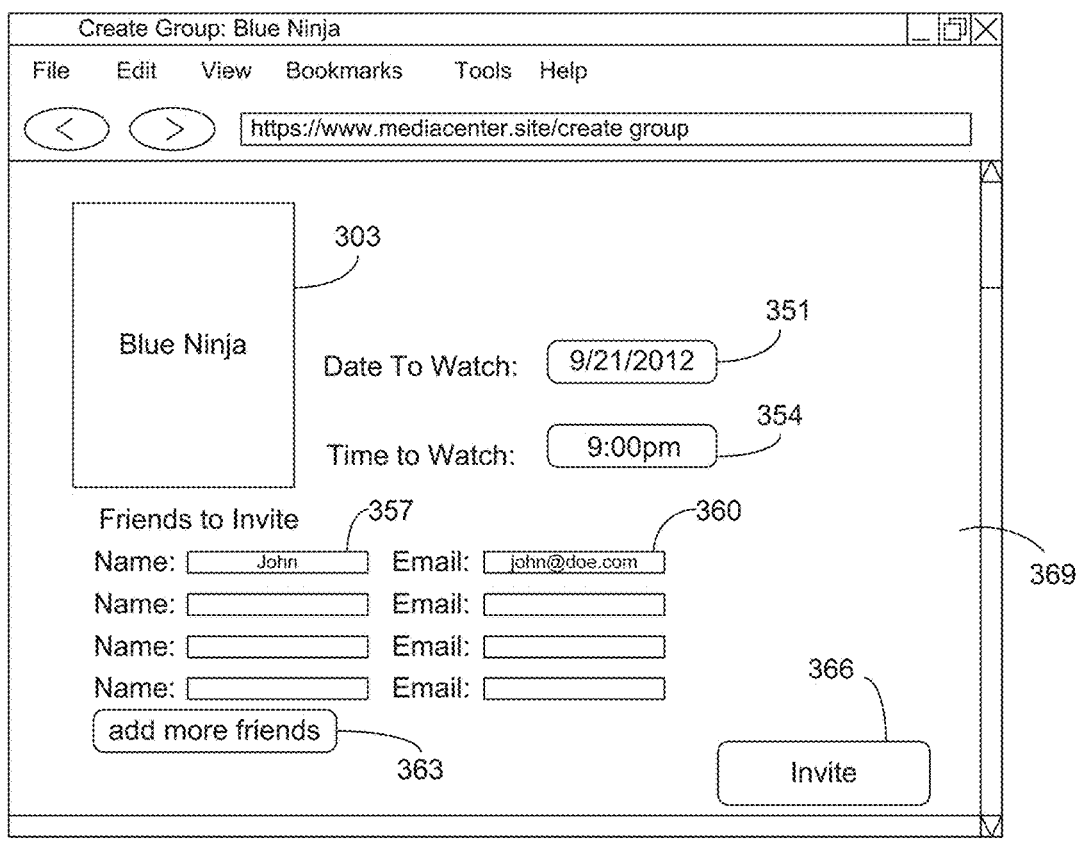

With reference now to FIG. 3B, shown is a drawing of an example of a user interface rendered by a client 206 (FIG. 2) in the networked environment 200 (FIG. 2) according to various embodiments of the present disclosure. In particular, FIG. 3B depicts an example of an invite group page 369 rendered by a client application 251 (FIG. 2) executing on the client 206. The invite group page 369 may comprise, for example, a pop-over window, a pop-under window, a separate window of the client application 251, a logical window comprising a portion of a primary window of the client application 251, or other type of view. The user may access the invite group page 369 from the selection view 300 in FIG. 3A upon selection of the invite group button 327, 330, 333, 336.

The invite group page 369 facilitates a user associated with a client 206 (FIG. 2) to input information about the media item streaming event including, the event time, event date, and group members invited to participate. The invite group page 369 may include a media item image 381, date input 351, time input 354, name input 357, email input 360, additional input control 363, invite control 366 and/or other information and/or controls relevant to inviting the group members. Although the non-limiting example in FIG. 3B shows that an input for an email address, it is understood that the contact information may be in the form of any type of notification address, such as, for example, an email address, telephone number, instant message user name, and/or other identifier used in transmitting an electronic message or notification.

Figure 3C:
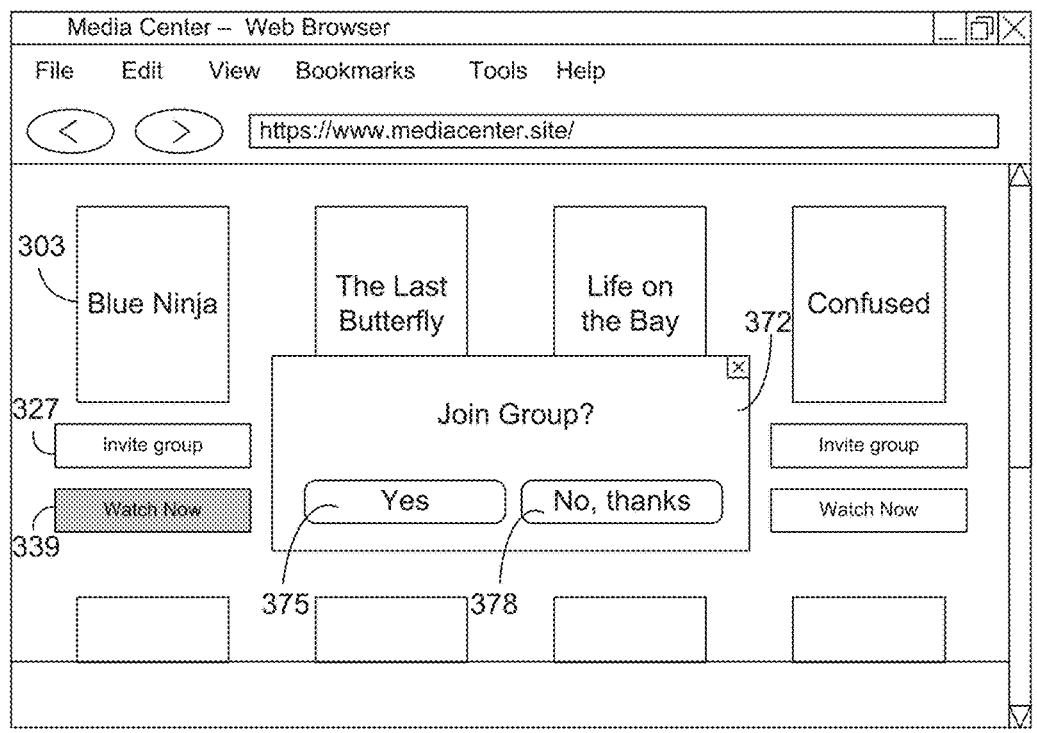

Turning now to FIG. 3C, shown is one example of a user interface rendered by the client 206 (FIG. 2) in the networked environment 200 (FIG. 2) according to various embodiments of the present disclosure. In particular, FIG. 3C depicts an example of a join group view 372 rendered by a client application 251 (FIG. 2) executing on the client 206. Further, the, join group view 372 may comprise, for example, a pop-over window, a pop-under window, a separate window of the client application 251, a logical window comprising a portion of a primary window of the client application 251, or other view. The join group view 372 may include an affirmative control 375, a decline control 378 and/or other controls that may be provided in other examples.

For example, the join group view 372 may be accessed upon selection of the watch now button 339, 342, 345, 348 from the selection view 300 in FIG. 3A. The user may be asked whether or not they want to join a group during the streaming of the selected media item content 266. If the user selects the affirmative control 375, media streaming event application 215 will add the user to a pool of users also requesting to view the same media item content 266 and participate in a group. If the user selects the decline control 378, the media streaming event application will initiate the streaming of the media item content 266 to be rendered on the media player user interface 257 on the client 206 of the user. Therefore, the user will not interact with other users.

Figure 4:
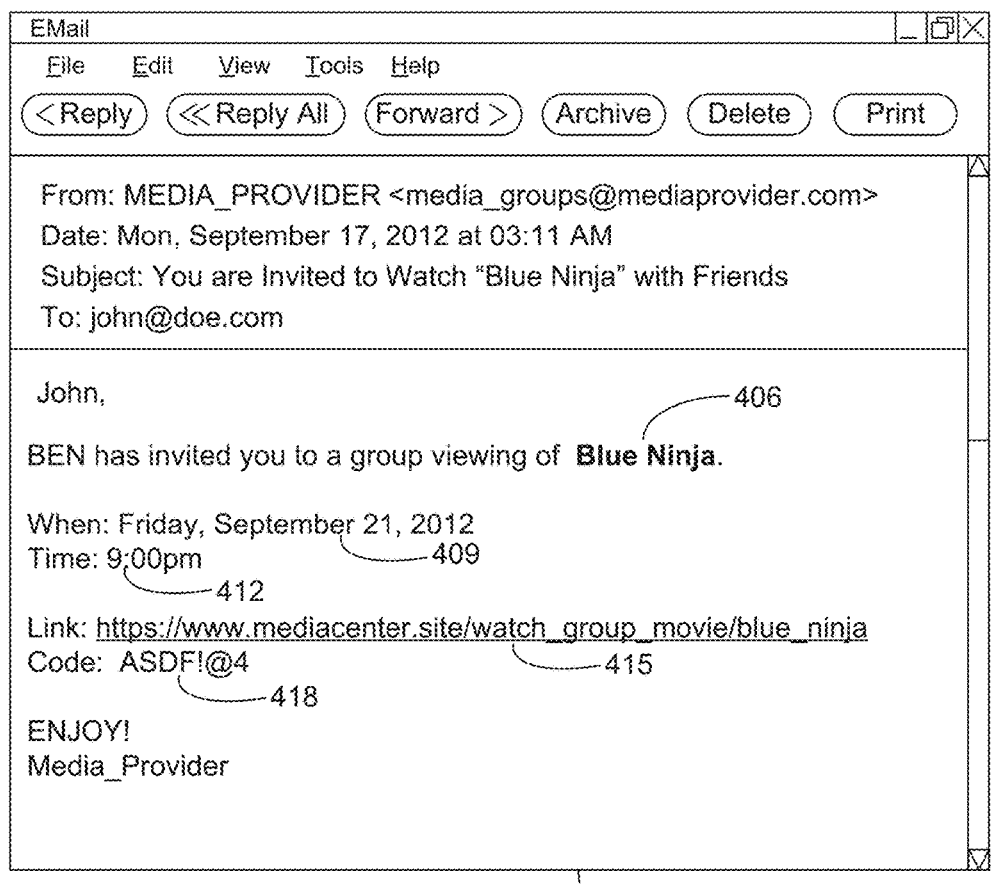

Moving on to FIG. 4, shown is one example of an invitation created by the invite group service 236 (FIG. 2). In particular, the invitation message 403 may be encoded with information pertaining to the media item streaming event. The invitation message 403 may include media item title 406, event date 409, event time 412, event access link 415, group member identifier 416 and/or other information or links relating to the media item streaming event. While the non-limiting example in FIG. 4 depicts an email message, it is to be understood that the invitation may be in the form of an electronic message, such as, for example, an email message, an instant message, a text message, a message embedded within a network page, or other type of message.

Upon receipt of the invitation message 403 from the media streaming event application 215, the potential group member may click the link provided at the time of the event to access the streaming of the media item content 266. If provided in the invitation message 403, the user may input the identifier so that the media streaming event application 215 places the potential group member in the selected group at the time of the scheduled event. An example of an access page upon clicking the provided link in the invitation message 403 is further described in FIG. 5.

Figure 5:
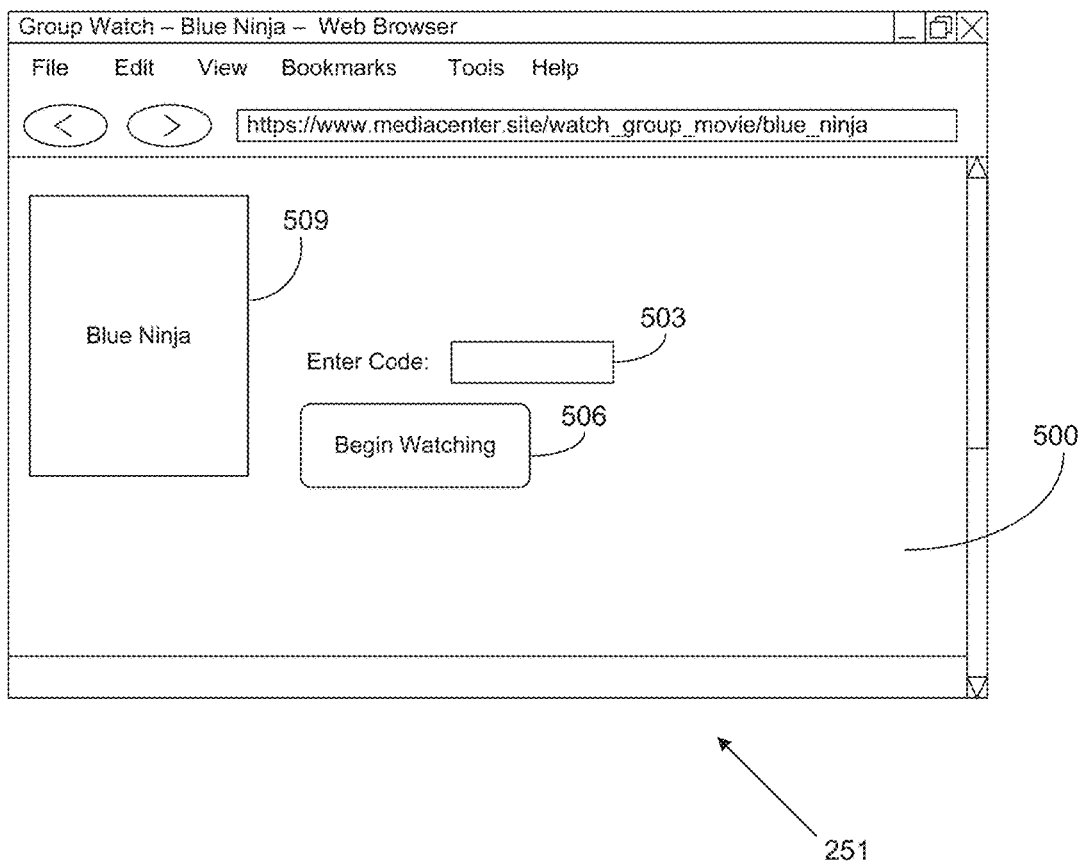

With reference now to FIG. 5, shown is a drawing of an example of a user interface rendered by a client 206 (FIG. 2) in the networked environment 200 (FIG. 2) according to various embodiments of the present disclosure. In particular, FIG. 5 depicts a non-limiting example of an access stream page 500 rendered by a client application 251 (FIG. 2) according to various embodiments of the present disclosure. In FIG. 5, the media item image 509 is displayed in reference to the media item content 266 that will be streamed during the media item streaming event. The access stream page 500, may include a media item image 509, a group identifier input 503, a begin streaming control 506, and/or other information or controls as can be appreciated.

The access stream page 500 may be accessed upon the selection of a link encoded in the invitation message 403 (FIG. 4) that may be sent to potential group members. The access stream page 500 provides the invited group members with access to the media item content 266. The invited group member may enter in the group member identifier 416 received via the invitation message 403 (FIG. 4) into the identifier input 503. Then the invited group member may click the begin streaming control 506. The media streaming event application 215 receives the group member identifier 416 and the request to being streaming the media item content 266 and subsequently facilitates the media item streaming event involving the invited group members that have requested to begin streaming the media item content 266.

Figure 6A:
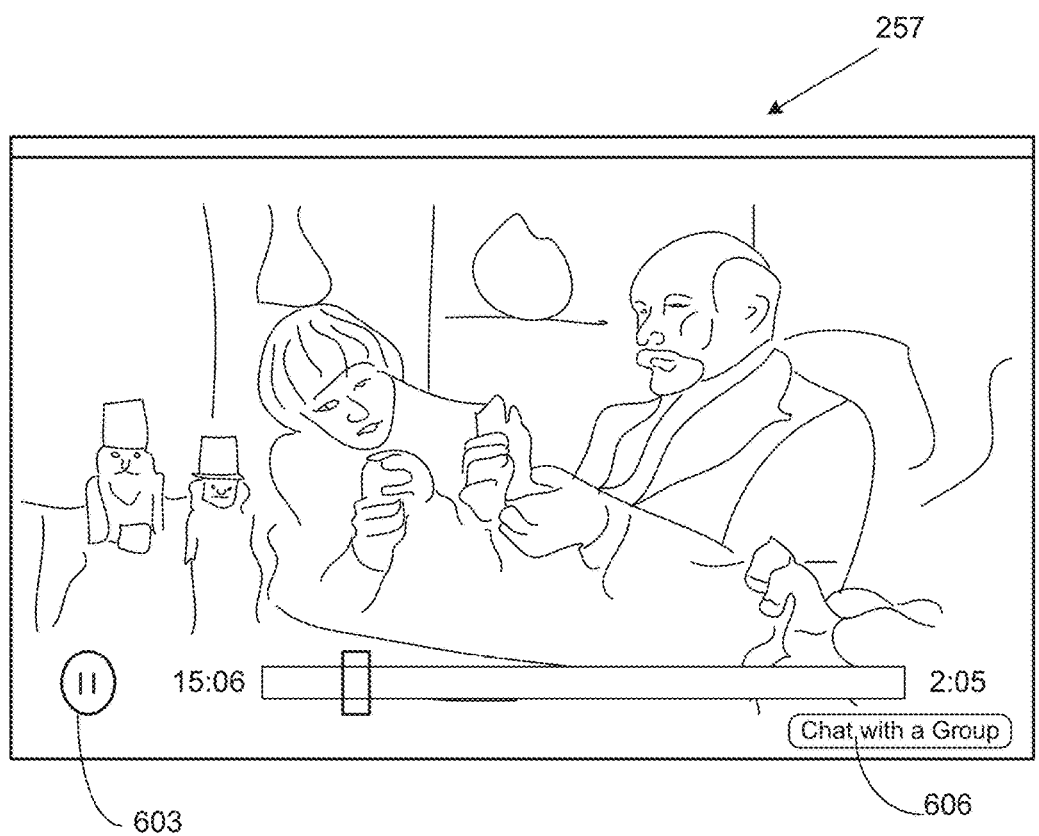

Referring next to FIG. 6A, shown is one example of a media player user interface 257 rendered on a display 254 (FIG. 2) on a client 206 (FIG. 2) in the networked environment 200 (FIG. 2) according to various embodiments. In particular, FIG. 6A depicts an example of the streaming media item content 266 rendered on the media player user interface 257 on a display 254 rendered by the client application 251 (FIG. 2). The media only interface 612 may include a pause control 603, join group control 606, and/or any other information and/or option selectors. Volume controls, fast forward controls, reverse controls, playback controls and/or other controls may be provided in other examples.

The example in FIG. 6A of the media player user interface 257 displaying only the media item content 266 may be used when a user does not select the option to participate in a group. However, as shown, the media only interface 612 may include a join group control 606. Upon selection of the join group control 606, the media streaming event application 215 adds the user to a pool of users requesting to be in a group. The media streaming event application 215 may then add the user to an already created group or creates a new group.

Figure 6B:
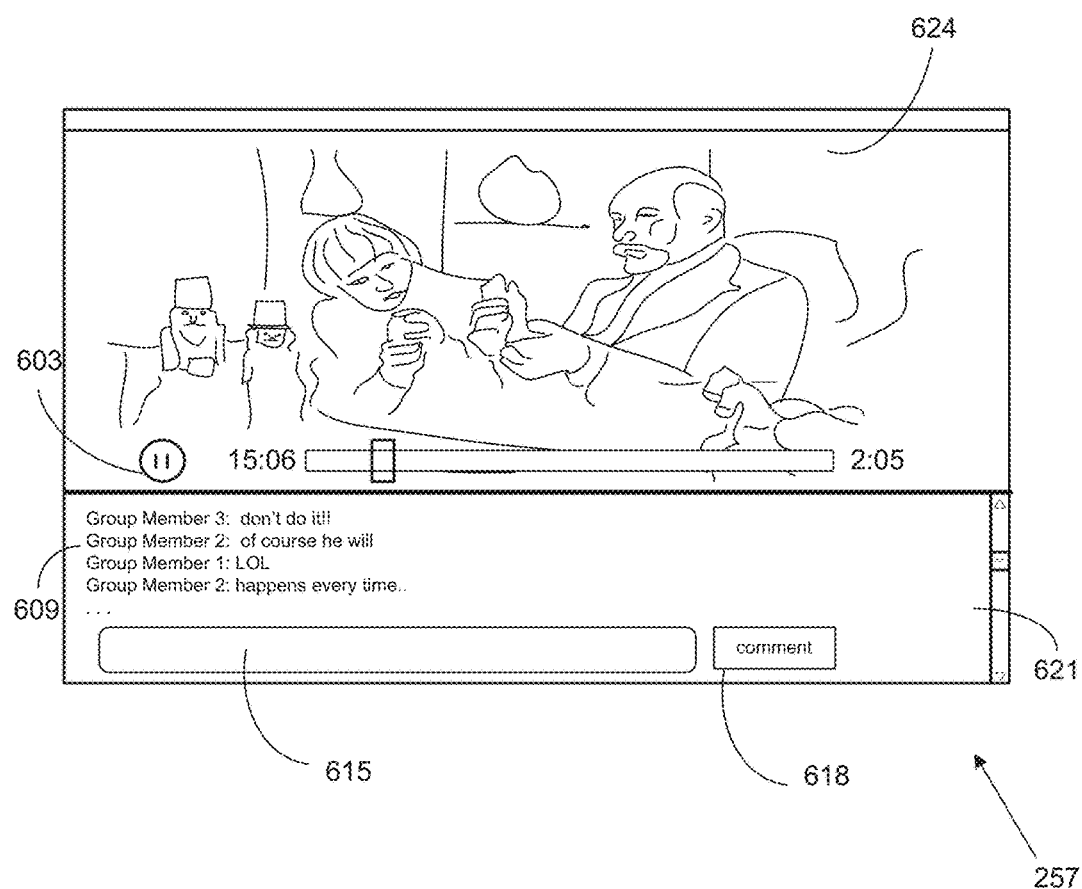

Moving on to FIG. 6B, shown is another example of a media player user interface 257 rendered on a display 254 (FIG. 2) on a client 206 (FIG. 2) in the networked environment 200 (FIG. 2) according to various embodiment. In particular, FIG. 6B depicts a non-limiting example where both the streaming media item content 266 and the output interaction data 263 are rendered on two separate portions of the media player user interface 257 on a display 254 on a client 206 in the networked environment 200 (FIG. 2). The media player user interface may include a media stream portion 624, communication portion 621, interaction communications 609, a pause control 603, a user-comment input 613, a comment control 618, and/or other information or controls that may be provided in other examples. In some embodiments, there may be a separate user interface for interacting with the other group members.

In a non-limiting example, the user-comment input 613, the comment control 618, interaction communications 609 and/or any other controls or data relating to the interaction of group members may be rendered on a separate user interface on the clients 206 associated with each of the group members. As such, the group interaction service 245 may render the output interaction data 263 on the separate user interface.

The example user interface shown in FIG. 6B, may be an example of the media player user interface 257 displayed when the user is participating in group during the media item streaming event. As shown, a user may enter in a comment in the user-comment input 613 and then send the comment over the network 209 to the media streaming event application 215 by selecting the comment control 618. The media streaming event application 215 then receives the comment as input interaction data 260. The media streaming event application 215 may then send the comment as output interaction data 263 to be displayed in the interaction communications 609 portion of the media player user interface 257 on each of the clients 206 associated with the group members.

Figure 7:
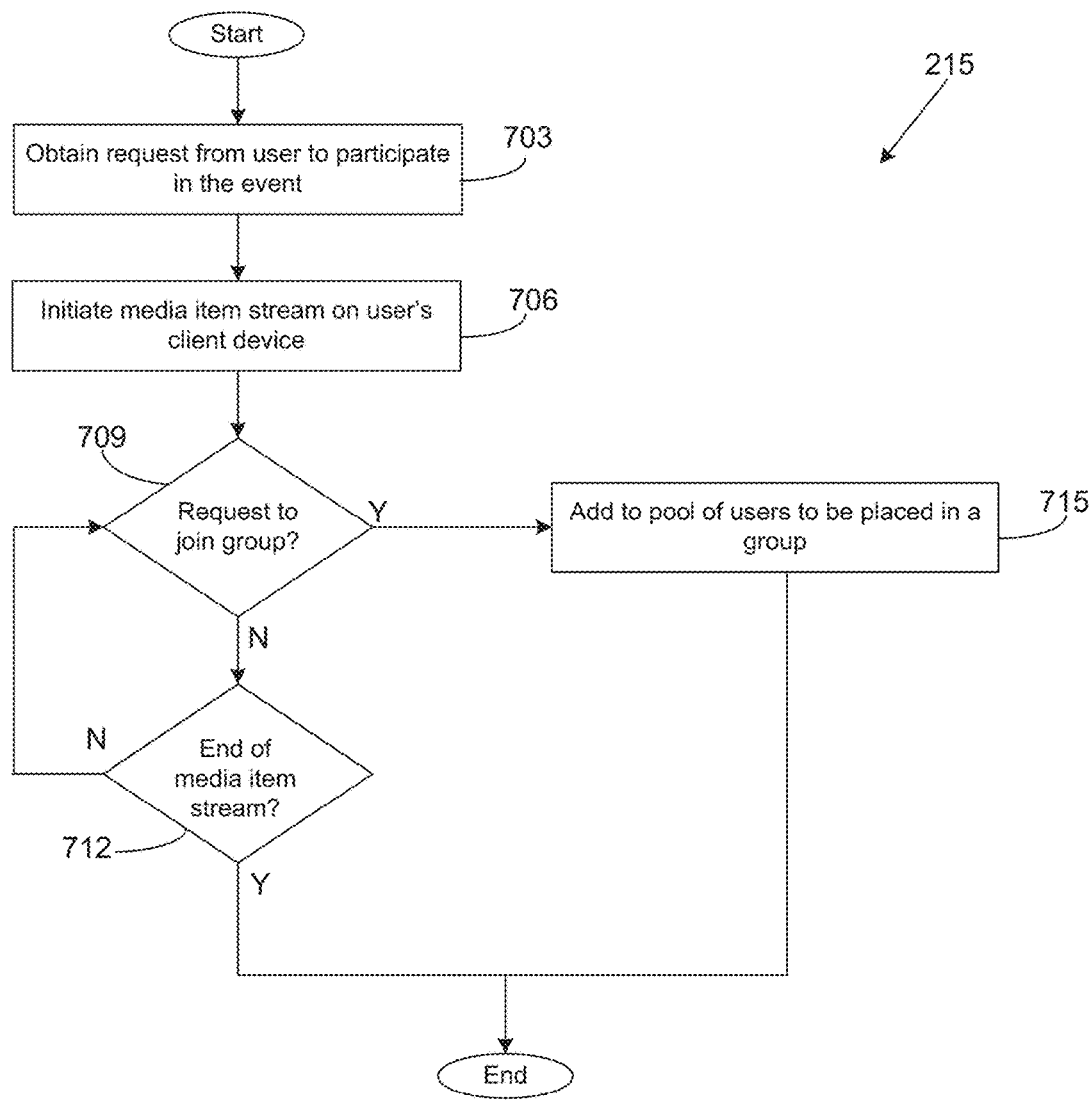
FIG. 7-10 are flowcharts illustrating examples of functionality implemented as portions of the media streaming event application executed in a computing environment in the networked environment of FIG. 2 according to various embodiments of the present disclosure.

Referring next to FIG. 7, shown is a flowchart that provides one example of the operation of a portion of the media streaming event application 215 according to various embodiments. It is understood that the flowchart of FIG. 7 provides merely an example of the many different types of functional arrangements that may be employed to implement the operation of the portion of the media streaming event application 215 as described herein. As an alternative, the flowchart of FIG. 7 may be viewed as depicting an example of steps of a method implemented in the computing environment 203 (FIG. 2) according to one or more embodiments.

FIG. 7 provides an example of the functionality that may be performed when a user requests to begin streaming selected media item content 266. The user may further request to join a group where the group comprises other users that also request to stream the same media item content 266 and join a group.

Beginning with box 703, the media streaming event application 215 may obtain a request from a user to participate in a media item streaming event that streams selected media item content 266. For example, the media streaming event application 215 provides a selection view 300 for a user to begin a media item streaming event. For example, by selecting the watch now button 339 on the selection view 300, a request will be sent to the computing environment 203 (FIG. 2) notifying the media streaming event application 215 of the request from a user to participate in a media item streaming event. After obtaining a request to participate in a media item streaming event, the media streaming event application 215 proceeds to box 706.

In box 706, the media streaming event application 215 initiates the transmission of the media item content 266 to a portion of the media player user interface 257 rendered on the client 206 (FIG. 2) via the media item streaming service 242. There are instances in which the media streaming event application 215 may pause the streaming of the media item content 266. For example, if it is previously known that the user will want to participate in a group, the streaming of the media item content 266 will pause until the pool of users is large enough to create a group. The media streaming event application 215 may synchronize the streaming of the media item content 266 to each of the clients associated with group members. Following the initiation of streaming of the media item content 266, the media streaming event application 215 proceeds to box 709.

In box 709 the media streaming event application 215 determines whether a request has been made to join a group. If there has not been a request, the media streaming event application proceeds to box 712 to determine whether the stream of the media item content 266 has completed. If the media item content 266 streaming has completed then the media streaming event application ends. If the media item content 266 streaming has not completed then the media streaming event application will proceed back to box 709 to determine whether a user has requested to join a group.

If in box 709, the media streaming event application 215 receives a request to join the group, the media streaming event application 215 proceeds to box 715. In box 715, the media streaming event application 215 adds the user to a pool of users to be placed in a group via the join group service 239. The media streaming event application 215 may pause the streaming of the media item content 266 until enough users have been added to the pool of users requesting to join a group. As will be discussed, the join group service 239 facilitates the creation of a group for interaction while streaming the media item content 266. Following the group, the media streaming event application 215 may re-initiate and synchronize the streaming of the media item content 266 to the clients 206 associated with the group members. Thereafter, the media streaming event application 215 ends.

Figure 8:
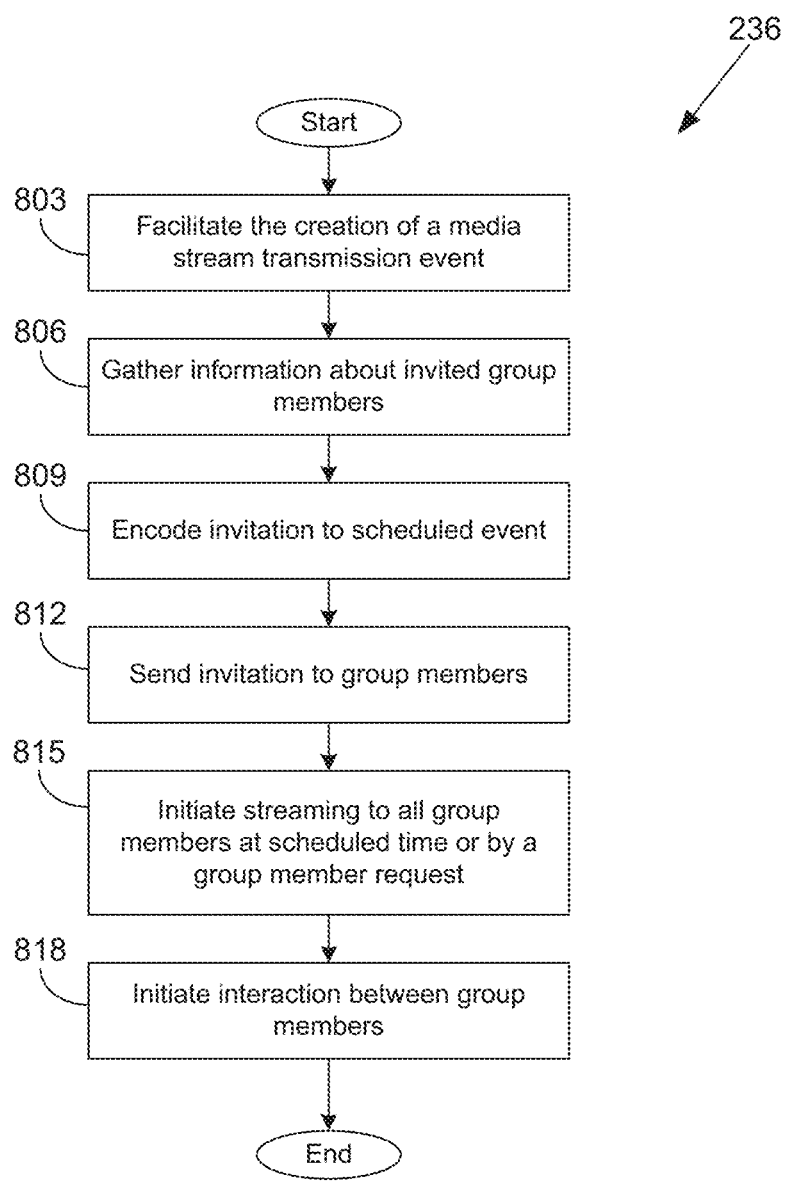

Referring next to FIG. 8, shown is a flowchart that provides one example of the operation of a portion of invite group service 236 according to various embodiments. It is understood that the flowchart of FIG. 8 provides merely an example of the many different types of functional arrangements that may be employed to implement the operation of the portion of the media streaming event application 215 as described herein. As an alternative, the flowchart of FIG. 8 may be viewed as depicting an example of steps of a method implemented in the computing environment 203 (FIG. 2) according to one or more embodiments.

FIG. 8 provides an example of the functionality that may be performed by the invite group service 236 as part of the media streaming event application 215 when a user selects to invite group members to participate in a media item streaming event. The example further discusses the steps required in notifying the potential group members as well as the actual streaming of the media item content 266 and facilitation of the group interaction. The flowchart begins after the user navigates through the selection page 300 (FIG. 3A) created by the media streaming event application 215. When the user selects the invite group button 327, 330, 333, 336 (FIG. 3A) relative to the media item content 266 that the user is requesting to consume, the media streaming event application 215 executes the invite group service 236.

Beginning with box 803, the invite group service 236 facilitates the creation of a media item streaming event. The invite group service 236 may provide a network page for the user to enter information pertaining to the requested invited group members. Following the facilitation of the creation of a media item streaming event invite group service 236 proceeds to box 806.

In box 806, the invite group service 236 gathers information about invited group members. The invite group service 236 will receive user input information that may include the group members' names and/or corresponding contact information. The corresponding contact information may be in the form of an email address, telephone number, instant message user name, and/or other identifier used in transmitting an electronic message. Additionally, the invite group service 236 may also gather a time and date of the event. The invite group service 236 may store the corresponding group information in the group data 227. Following gathering information about invited group members, the invite group service 236 proceeds to box 809.

In box 809, the invite group service 236 encodes invitations to the scheduled event. The invitation may be encoded to include, for example, the name of the inviting user, the name of the media item streaming event, the date of the media item streaming event, and/or the time of the media item streaming event. The invitation may also be encoded to include a link used to access the media item streaming event and/or a type of identifier used to identify the invited group member relative to the media item streaming event. Following encoding the invitation, the invite group service 236 proceeds to box 812

In box 812, the invite group service 236 sends the encoded invitation to the group members using the contact information gathered in box 806. The invitation may be transmitted to the group members at a respective client 206 by way of an electronic message, such as, for example, an email message, an instant message, a text message, a message embedded within a network page, or other type of message. After sending the encoded invitation, the invite group service 236 proceeds to box 815.

In box 815, the invite group service 236 initiates streaming via the media item streaming service 242. The media item streaming service 242 implements the streaming of the media item content 266 to a user interface rendered on the clients 206 of each of the respected group members. As a non-limiting example, the media item streaming service 242 may initiate streaming at a predetermined date and time. In another non-limiting example, the media item streaming service 242 may initiate streaming after verifying that all group members have accessed the media item streaming event. In another non-limiting example, the media item streaming service 242 may initiate streaming after receiving a request from a specified group member. Following initiating streaming of the media item content 266, invite group service 236 proceeds to box 818.

In box 818, the invite group service 236 initiates interaction between group members via the group interaction service 245. As discussed in more detail relative to FIG. 10, the group interaction service 245 facilitates interaction between group members by receiving an input interaction data 260 from a media player user interface 257 rendered on a client 206 associated with a group member and then sending output interaction data 263 to the media player user interface 257 on the other clients 206 associated with the other group members. Thereafter, invite group service 236 ends.

Figure 9:
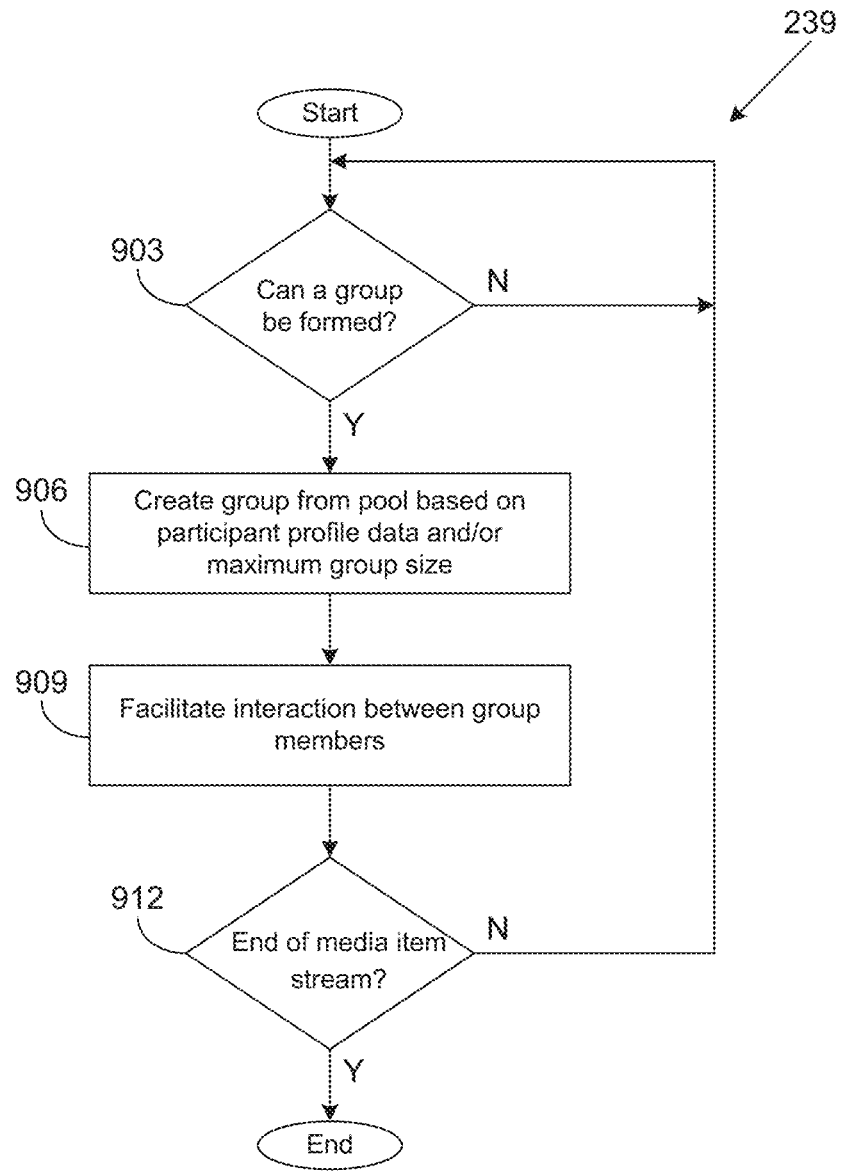

Turning now to FIG. 9, shown is a flowchart that provides one example of the operation of the join group service 239 according to various embodiments. It is understood that the flowchart of FIG. 9 provides merely an example of the many different types of functional arrangements that may be employed to implement the operation of the join group service 239 as described herein. As an alternative, the flowchart of FIG. 9 may be viewed as depicting an example of steps of a method implemented in the computing environment 203 (FIG. 2) according to one or more embodiments.

FIG. 9 provides an example of the functionality that may be performed by the join group service 239 in creating groups based on the pool of users requesting to be part of a group during the streaming of the same media item content 266.

Beginning with box 903, the join group service 239 determines whether there are enough users to form a group based on a predetermined quorum. For example, the predetermined quorum may be based on a minimum number of users within the pool of users. Alternatively, predetermined quorum may be based on the minimum number of users in the pool of users with enough common characteristics to form a group. If the predetermined quorum has not been established, then the join group service 239 will continue to pool users that have requested to join a group for a media item streaming event and will return to box 903 to determine whether a predetermined quorum of the group members has been established. However, if the predetermined quorum has been established, then the join group service 239 proceeds to box 906.

In box 906, the join group service 239 creates one or more groups of users from the pool of users. As a non-limiting example, a group may be created based on the number of interested users not to exceed a predetermined maximum group size. For example, if the predetermined group size is fifty users, than a group will be created after fifty users have requested to join a group. Additionally, as another non-limiting example, a group may be created based on common characteristics of the users. The common characteristics may be determined based on the profile data 238 that corresponds to each user requesting to join a group. The profile data 238 may include, for example, at least one of the following factors: demographics, geographic location, viewing history, purchase history, culture, and favorite prior participants. For example, the groups may be formed based on multiple user ages. If one user is twenty-six years old, then the join group service 239 may place that user in a group with other users between the ages of twenty-six and thirty years old.

Likewise, for example, the join group service 239 may create groups based on purchase history. If the selected movie is a sci-fi movie, the join group service 239 may group users who have all previously shown a sci-fi interest based on prior purchase or viewing history. Therefore, those users who have more interest in sci-fi might have a more meaningful experience with others having a like interest rather than users who just casually watch movies with no direct interest. In another non-limiting example, a user may identify other users that the user interacted with on a prior movie watching event on a preferred list stored in the user's associated profile data 238. Likewise, the user could also select to place other users on a blacklist within their associated profile data 238 if they did not enjoy a prior experience. The join group service 239 may avoid grouping the blacklisted users in the same group as the requesting user. Therefore, the join group service 239 may create the groups based on user preferences.

The join group service 239 may also create groups by determining a likeness factor based on evaluating the profile data. In a non-limiting example, the join group service 239 may compare the profile data 238 of the users and assign each user a likeness factor. For example, based on a scale of one to ten, only those users who have a likeness factor of seven and higher will be placed in a group. After grouping the pool of users, the join group service 239 will proceed to box 909.

In box 909, the join group service 239 initiates interaction between group members through the group interaction service 245. As will be explained in more detail in reference to FIG. 10, the group interaction service 245 facilitates interaction between group members by receiving an input interaction data 260 from a client 206 associated with a group member and then sending output interaction data 263 to the other clients 206 associated with the other group members. Thereafter, the join group service 239 proceeds to box 912.

In box 912, the join group service 239 determines whether the streaming of the media item content 266 has ended. If the streaming of the media item content 266 has not ended, the join group service 239 proceeds back to box 903 to continue to form groups during the streaming of the media item content 266. For example, a user may decide mid-way through watching a movie that they want to be part of a group. The user may select to join a group, and subsequently be added to the pool of users. Therefore, the join group service 239 may continue to form groups throughout the streaming of the media item content 266. However, if the streaming of the media item content has ended, the join group service 239 ends.

Figure 10:
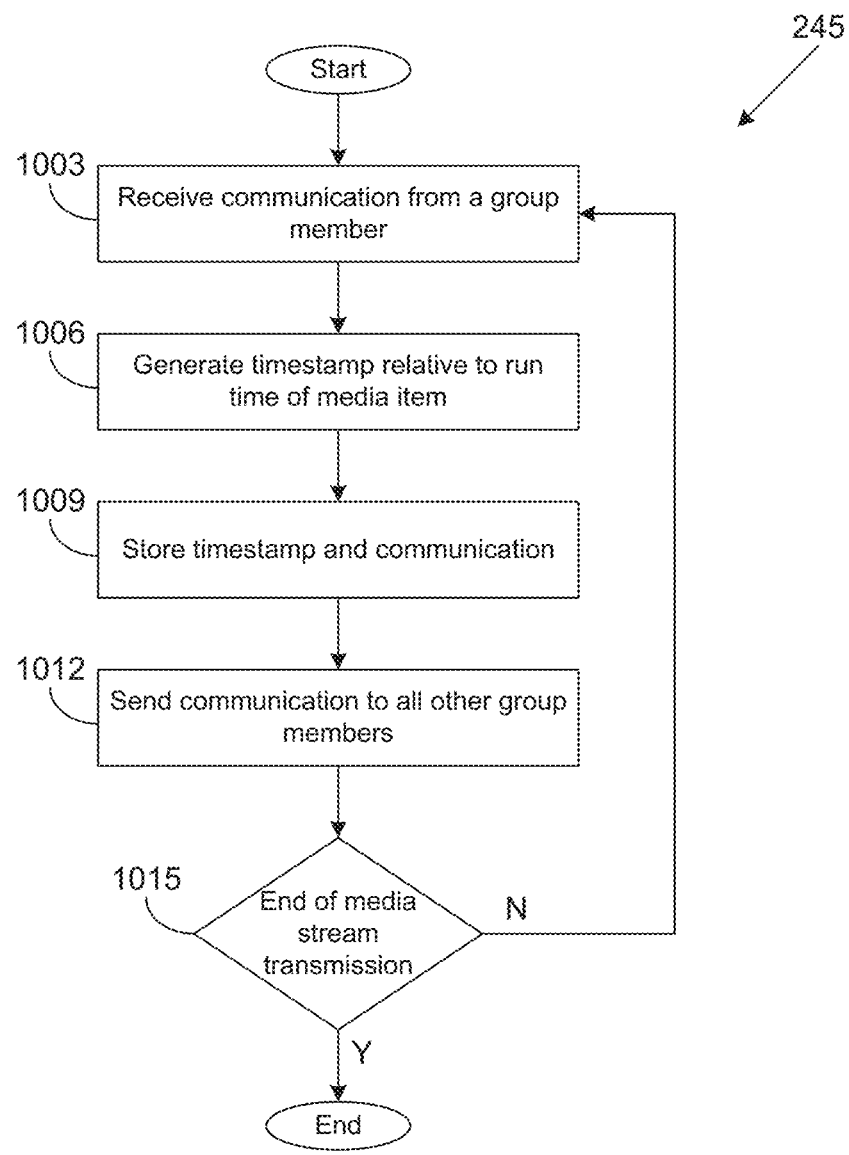

Turning now to FIG. 10, shown is a flowchart that provides one example of the operation of a portion of the group interactive service 245 according to various embodiments. It is understood that the flowchart of FIG. 10 provides merely an example of the many different types of functional arrangements that may be employed to implement the operation of the group interactive service 245 as described herein. As an alternative, the flowchart of FIG. 10 may be viewed as depicting an example of steps of a method implemented in the computing environment 203 (FIG. 2) according to one or more embodiments.

FIG. 10 provides an example of the functionality that may be performed by the group interaction service 245 in facilitating the interaction between group members during a media item streaming event.

Beginning with box 1003, the group interaction service 245, receives a communication from a user input on a media player user interface 257 on a client 206 associated with one of the group members. The communication may be in the form of a text-based message, video content, graphics, audio, or any other form of communication. After receiving a communication from a client 206 the group interaction service 245 proceeds to box 1006.

In box 1006, the group interaction service 245 generates a timestamp relative to the run time of the streaming media item content 266. After the timestamp, the group interaction service proceeds to box 1009. In box 1009, the group interaction service 245 stores the received communication and the associated timestamp in the media interaction data 230. After storing the timestamp and associated communication, the group interaction service 245 proceeds to box 1012.

In box 1012, the group interaction service 245 sends the communication to all other clients 206 associated with the group members to be rendered on a portion of the media player user interface 257. After sending the communication to the other clients 206, the group interaction service 245 proceeds to box 1015. In box 1015, the group interaction service 245 determines whether the media item content transmission has completed. If the media item content is still transmitting, then the group interaction service 245 proceeds back to box 1003 to receive a communication. If it has completed then the group interaction service 245 ends.

Figure 11:
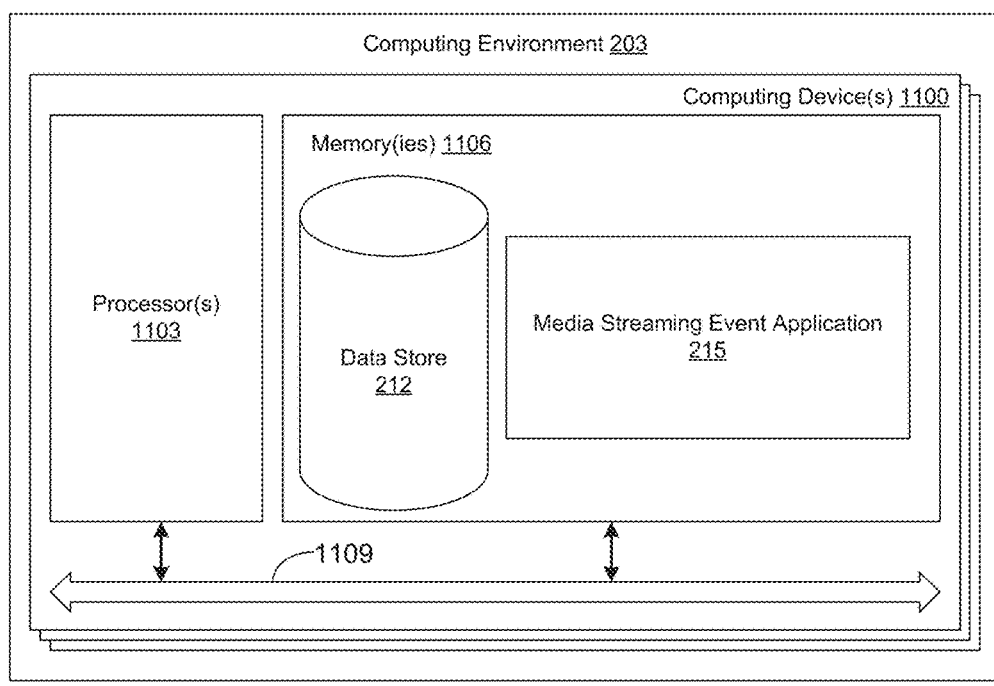
FIG. 11 is a schematic block diagram that provides one example illustration of a computing environment employed in the networked environment of FIG. 2 according to various embodiments of the present disclosure.

With reference to FIG. 11, shown is a schematic block diagram of the computing environment 203 according to an embodiment of the present disclosure. The computing environment 203 includes one or more computing devices 1100. Each computing device 1100 includes at least one processor circuit, for example, having a processor 1103 and a memory 1106, both of which are coupled to a local interface 1109. To this end, each computing device 1100 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are media streaming event application 215, and potentially other applications. Also stored in the memory 1106 may be a data store 212 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and/or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the media streaming event application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7-10 show the functionality and operation of an implementation of portions of the media streaming event application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 7-10 show a specific order of execution, it is understood that the order of execution may differ from that which is depicted. For example, the order of execution of two or more blocks may be scrambled relative to the order shown. Also, two or more blocks shown in succession in FIGS. 7-10 may be executed concurrently or with partial concurrence. Further, in some embodiments, one or more of the blocks shown in FIGS. 7-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media streaming event application 215, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
  code that transmits a media item to a client device as part of a first media item transmission, the media item to be rendered on a media player user interface on the client device, and the client device being associated with a user;
  code that receives a request from the user to join a group of participants that have indicated an interest in participating in a media transmission event, the media transmission event comprising a second media item transmission of the media item to a plurality of client devices, the media item to be rendered on the media player user interface on the plurality of client devices, wherein the plurality of client devices is associated with the participants in the group, wherein the request is received during the first media item transmission of the media item to the client device;
  code that synchronizes the second media item transmission of the media item to the plurality of client devices with the first media item transmission to the client device associated with the user, the media item to be rendered on the media player user interface on the client device and the plurality of client devices; and code that facilitates an interaction between the user and other participants in the group through the media player user interface on the client device concurrent with rendering of the media item, the interaction comprising an exchange of a plurality of communications between the participants in the group during the media transmission event.

2. The non-transitory computer-readable medium of claim 1, further comprising code that selects the group of participants for the user to join based at least in part on participant profile data for the user that includes at least one of the following: a demographic, a geographic location, a viewing history, a purchase history, a culture, or at least one favorite prior participant.

3. The non-transitory computer-readable medium of claim 1, further comprising code that receives a message from the client device associated with the user and sends the message to other client devices associated with the group of participants for rendering on the media player user interface associated with the other client devices.

4. The non-transitory computer-readable medium of claim 3, further comprising:
  code that generates a first timestamp corresponding to a location of the media item during the first media item transmission upon receiving the request from the client device; and
  code that stores both the message received from the client device and a second timestamp corresponding to a current location of the media item of the second media item transmission that is associated with the message.

5. A system comprising:
  at least one computing device; and
  a media streaming event application executable in the at least one computing device, the media streaming event application comprising:
    logic that transmits a media item to a client device as part of a first media item transmission, the media item to be rendered on a first portion of a media player user interface on the client device, and the client device being associated with a user;
    logic that receives a request from the user to join a group of participants that have indicated an interest in participating in a media transmission event, the media transmission event comprising a second media item transmission of the media item to a plurality of client devices, the media item to be rendered on the first portion of the media player user interface on the plurality of client devices, wherein the plurality of client devices is associated with the participants in the group, wherein the request is received during the first media item transmission of the media item to the client device;
    logic that synchronizes the second media item transmission of the media item to the plurality of client devices with the first media item transmission to the client device associated with the user; and
    logic that facilitates an interaction between the participants in the group including the user concurrent with rendering of the media item, the interaction comprising an exchange of a plurality of communications by the participants in the group during the media transmission event.

6. The system of claim 5, wherein the media streaming event application further comprises logic that stores individual ones of the plurality of communications during the second media item transmission of the media item with a corresponding timestamp of the media item, the corresponding timestamp being associated with receiving a respective communication of the plurality of communications.

7. The system of claim 6, wherein the media streaming event application further comprises logic that replays the media transmission event by retransmitting the media item and the plurality of communications to at least one of the plurality of client devices, the individual ones of the plurality of communications being rendered on a second portion of the media player user interface based at least in part on the corresponding timestamp.

8. The system of claim 5, wherein the logic that facilitates the interaction further comprises:
  logic that receives a particular communication of the plurality of communications by a respective group participant of the group of participants from a particular client device of the plurality of client devices; and
  logic that sends the particular communication to other ones of the plurality of client devices to be rendered on a second portion of the media player user interface of the other ones of the plurality of client devices.

9. The system of claim 5, wherein the media streaming event application further comprises logic that pauses the second media item transmission of the media item to the plurality of client devices in response to a pause request from one of the participants in the group.

10. The system of claim 9, wherein the media streaming event application further comprises logic that restarts the second media item transmission of the media item to the plurality of client devices in response to a restart request from the one of the participants in the group, the second media item transmission of the media item being restarted at a location of the media item where the transmission of the media item paused.

11. The system of claim 5, further comprising logic that selects the group of participants for the user to join based at least in part on participant profile data for the user that includes at least one of the following: a demographic, a geographic location, a viewing history, a purchase history, a culture, or at least one favorite prior participant.

12. The system of claim 11, wherein the user is selected to join the group based at least in part on the participants in the group sharing a common characteristic with the user.

13. The system of claim 5, wherein the plurality of communications comprises video content, graphic content, or audio content.

14. A method, comprising:
  transmitting, by at least one computing device, a media item to a plurality of client devices for rendering as a first portion of a media player user interface, individual ones of the plurality of client devices being associated with a respective participant in a group of participants that have indicated an interest in participating in a media streaming event;
  facilitating, in the at least one computing device, an interaction between the participants in the group through a second portion of the media player user interface rendered on the individual ones of the plurality of client devices, the interaction comprising an exchange of at least one communication by the participants in the group during the media streaming event;
  storing, in the at least one computing device, the at least one communication with a timestamp corresponding to a location of the media item during the media streaming event upon receiving the at least one communication relative to the location of the media item being transmitted; and replaying the media streaming event by retransmitting the media item and the at least one communication to at least one client device of the plurality of client devices, the at least one communication being rendered on the second portion of the media player user interface of the at least one client device based at least in part on the corresponding timestamp.

15. The method of claim 14, further comprising:

transmitting, by the at least one computing device, the media item to another client device;

obtaining, by the at least one computing device, a request to join the group from the another client device while transmitting the media item to the plurality of client devices; and synchronizing, by the at least one computing device, the transmission of the media item between the another client device and the plurality of client devices.

16. The method of claim 15, wherein the synchronizing of the transmission of the media item comprises re-initiate streaming of the media item from its beginning to the another client device and the plurality of client devices.

17. The method of claim 14, wherein the location of the media item is defined relative to a runtime of the media item when receiving the at least one communication from the at least one client device.

18. The method of claim 14, wherein facilitating, in the at least one computing device, the interaction between the participants in the group, further comprises:

receiving, in the at least one computing device, the at least one communication from a particular client device of the plurality of client devices associated with a particular participant of the participants in the group; and sending, by the at least one computing device, the at least one communication to other ones of the plurality of client devices for rendering in the second portion of the media player user interface of the other ones of the plurality of client devices.

19. The method of claim 14, wherein the user is selected to join the group based at least in part on none of the participants in the group having been blacklisted by the user.

20. The method of claim 14, further comprising sending a notification of the media streaming event to the participants in the group.

* * * * *